(12) United States Patent
Mathiesen et al.

(10) Patent No.: US 9,624,759 B2
(45) Date of Patent: Apr. 18, 2017

(54) METHOD AND AN ARRANGEMENT FOR CONTROLLING FLUID FLOW INTO A PRODUCTION PIPE

(75) Inventors: Vidar Mathiesen, Porsgrunn (NO); Haavard Aakre, Skien (NO); Torstein Grøstad, Prosgrunn (NO)

(73) Assignee: STATOIL PETROLEUM AS, Stavanger (NO)

( * ) Notice: Subject to any disclaimer, the term of this patent is extended or adjusted under 35 U.S.C. 154(b) by 443 days.

(21) Appl. No.: 14/343,740

(22) PCT Filed: Sep. 8, 2011

(86) PCT No.: PCT/EP2011/065521
§ 371 (c)(1),
(2), (4) Date: Apr. 15, 2014

(87) PCT Pub. No.: WO2013/034184
PCT Pub. Date: Mar. 14, 2013

(65) Prior Publication Data
US 2014/0216733 A1    Aug. 7, 2014

(51) Int. Cl.
*E21B 34/08*    (2006.01)
*E21B 43/12*    (2006.01)
*E21B 43/32*    (2006.01)
*G05D 7/01*    (2006.01)

(52) U.S. Cl.
CPC .............. *E21B 43/12* (2013.01); *E21B 34/08* (2013.01); *E21B 43/122* (2013.01); *E21B 43/32* (2013.01); *G05D 7/0146* (2013.01)

(58) Field of Classification Search
USPC ................................ 166/252.5, 53
See application file for complete search history.

(56) References Cited

U.S. PATENT DOCUMENTS

| | | | |
|---|---|---|---|
| 5,655,605 A | 8/1997 | Matthews | |
| 2005/0103497 A1 | 5/2005 | Gondouin | |
| 2005/0267718 A1* | 12/2005 | Guyaguler | G06Q 10/0631 703/10 |
| 2009/0218089 A1 | 9/2009 | Steele et al. | |
| 2009/0218103 A1* | 9/2009 | Aakre | E21B 34/08 166/373 |

(Continued)

FOREIGN PATENT DOCUMENTS

| | | |
|---|---|---|
| CA | 2 677 138 A1 | 3/2011 |
| WO | WO 2008/004875 A1 | 1/2008 |

(Continued)

*Primary Examiner* — Taras P Bemko
(74) *Attorney, Agent, or Firm* — Birch, Stewart, Kolasch & Birch, LLP

(57) ABSTRACT

A method of controlling fluid flow into a heavy oil production pipe is disclosed. The method involves reducing inflow into a production pipe locally from hot spots using inflow control devices comprising a movable body provided within a housing. The movable body is arranged to adjust the flow of fluid through the inflow control devices autonomously by exploiting the Bernoulli principle. Inflow into the production pipe remote from said hot spots may be increased using the inflow control devices to increase inflow locally, and draw down in said production pipe may be increased by using an injector to inject a gaseous medium at or downstream of said inflow control devices.

22 Claims, 4 Drawing Sheets

(56) References Cited

U.S. PATENT DOCUMENTS

| | | | | |
|---|---|---|---|---|
| 2010/0126727 A1* | 5/2010 | Vinegar | ............... | B09C 1/02 |
| | | | | 166/302 |
| 2011/0168413 A1* | 7/2011 | Bachtell | ............ | E21B 43/122 |
| | | | | 166/401 |

FOREIGN PATENT DOCUMENTS

| | | |
|---|---|---|
| WO | WO 2009/108059 A2 | 9/2009 |
| WO | WO 2011/098328 A2 | 8/2011 |

\* cited by examiner

METHOD AND AN ARRANGEMENT FOR CONTROLLING FLUID FLOW INTO A PRODUCTION PIPE

TECHNICAL FIELD

The present invention relates to a method and an arrangement for controlling fluid flow into a heavy oil production pipe provided with inflow control devices. The invention may for example be used to control the mass flow of hydrocarbons into a production pipe in a wellbore.

BACKGROUND ART

Devices for recovering of oil and gas from long, horizontal and vertical wells are known from U.S. Pat. Nos. 4,821,801, 4,858,691, 4,574,691 and GB patent publication No. 2169018. These known devices comprise a perforated drainage pipe with, for example, a filter for control of sand around the pipe. A considerable disadvantage with the known devices for oil/and or gas production in highly permeable geological formations is that the pressure in the drainage pipe increases exponentially in the upstream direction as a result of the flow friction in the pipe. Because the differential pressure between the reservoir and the drainage pipe will decrease upstream as a result, the quantity of oil and/or gas flowing from the reservoir into the drainage pipe will decrease correspondingly. The total oil and/or gas produced by this means will therefore be low. With thin oil zones and highly permeable geological formations, there is further a high risk that of coning, i.e. flow of unwanted water or gas into the drainage pipe downstream, where the velocity of the oil flow from the reservoir to the pipe is the greatest.

When extracting oil from reservoirs by injection of steam or using combustion, the differential pressure can vary along the drainage pipe. Variations in differential pressure can be caused by an uneven distribution or propagation of injected steam and/or combustion heat in the reservoir. Fluids present in the reservoir formation, which fluids can be formation water, condensed steam and/or liquid hydrocarbons, are at or near their respective boiling points. Under such conditions, changes in pressure may cause the fluids to flash or boil to produce gas or steam. This may cause problems should the gas or steam reach the valves used for draining fluid from the reservoir into the production pipe, as many such valves are not able to close to prevent steam or combustion gas from entering the production pipe. In particular, if the differential pressure is relatively low, ingress of steam or combustion gas can lead to a "short circuit" of the injection pressure and the production pressure. This will cause the differential pressure to drop even further, which has a negative effect on the efficiency of the drainage process. The efficiency is determined by the amount of injected energy versus the produced oil volume.

A further result of areas with low pressure differential combined with high temperature, also termed hot spots, is that fluid with low viscosity from high temperature regions of the reservoir will dominate the inflow into the production pipe. In this way, the production pipe will have an undesirable inflow profile along its length.

A break-through of hot fluids, such as hydrocarbons and or water, at temperatures near their respective boiling points can cause the fluid to flash or boil inside the production pipe. If this occurs upstream of or in a down-hole pump this will have a detrimental effect on the operation of the pump and will result in a limitation of the draw down, that is, the pressure difference between the reservoir pressure and the pressure in the production pipe.

From World Oil, vol. 212, N. 11 (11/91), pages 73-80, is previously known to divide a drainage pipe into sections with one or more inflow restriction devices such as sliding sleeves or throttling devices. However, this reference is mainly dealing with the use of inflow control to limit the inflow rate for up hole zones and thereby avoid or reduce coning of water and or gas.

WO-A-9208875 describes a horizontal production pipe comprising a plurality of production sections connected by mixing chambers having a larger internal diameter than the production sections. The production sections comprise an external slotted liner which can be considered as performing a filtering action. However, the sequence of sections of different diameter creates flow turbulence and prevents the running of work-over tools operated along the outer surface of the production pipe.

Inflow control devices or autonomous valves as disclosed in the international publications WO 2009/088292 and WO 2008/004875 are robust, can withstand large forces and high temperatures, can prevent draw downs (differential pressure), need no energy supply and can withstand sand production. At the same time they are reliable, simple and very cheap. However, several improvements might nevertheless be made to increase the performance and longevity of the above devices.

When extracting oil and or gas from geological production formations, fluids of different qualities, i.e. oil, gas, water, are produced in different amounts and mixtures depending on the property or quality of the formation. None of the above-mentioned, known devices are able to distinguish between and control the inflow of oil, gas or water on the basis of their relative composition and/or quality. In particular, the known devices are not able to control variations in inflow into the production pipe due to variations of differential pressure caused by temperature variations. Said valves are also unable to control the effects of fluid flashing or boiling inside the production pipe.

The present invention provides an improved production pipe which aims to minimize problems relating to variations in inflow into the production pipe due to temperature variations. The invention further aims to reduce problems relating to fluids flashing or boiling in a production pipe.

SUMMARY OF THE INVENTION

The invention provides a method, production system, and use of inflow control devices as set out in the accompanying claims.

The above problems are solved by a method and a production pipe for controlling inflow into a production pipe according to the appended claims. The inflow control devices are preferably self adjusting or autonomous. The inflow control devices can easily be fitted in the wall of a production pipe and allow the use of work-over tools. The device is designed to "distinguish" between the oil and/or gas and/or water and is able to control the flow or inflow of oil or gas, depending on which of these fluids such flow control is required.

The "fluid" referred to in the text can comprise liquid phase hydrocarbons (e.g. oil or bitumen), gas phase hydrocarbons or be a mixed fluid containing a mixture of liquid phase hydrocarbons and/or gaseous hydrocarbons and/or water. In the text below, the boiling point of an element or a substance is the temperature at which the vapor pressure of the liquid equals the environmental pressure surrounding the liquid. The saturation temperature is equivalent to the boiling point. The saturation temperature is the temperature for a corresponding saturation pressure at which a liquid boils into its vapor phase.

In one embodiment, when reducing inflow in sections of the drainage pipe where fluid in the formation is at or above its boiling point, the inflow control devices uses the Bernoulli effect and any stagnation pressure created over the movable body. In this way the inflow control devices, depending on the composition and viscosity of the fluid, will close at least partially to reduce inflow locally.

When increasing inflow in sections of the drainage pipe where fluid in the formation is below its boiling point, said inflow control devices use the same effect, whereby the inflow control devices will open to increase inflow locally The method may involve controlling the inflow control devices depending on at least one of the composition, the density and/or viscosity of the fluid.

In one embodiment, inflow is reduced in sections of the drainage pipe where fluid in the formation is at or above its boiling point by closing said autonomous inflow control devices at least partially. Inflow is reduced through the inflow control devices by allowing the movable body to reduce the flow of fluid autonomously in response to an increase in flow velocity and/or a reduction in viscosity in the fluid. Inflow through the inflow control devices can also be reduced by allowing the movable body to reduce the flow of fluid autonomously in response to an increase in temperature in the fluid.

While reducing the inflow in sections of the drainage pipe located in a hot spot, the method may also involve increasing inflow in sections of the drainage pipe remote from such hot spots, where fluid in the formation is below its boiling point, using said inflow control devices using said autonomous inflow control devices. Inflow through the inflow control devices can be increased by allowing the movable body to increase the flow of fluid autonomously in response to a reduction in flow velocity and/or an increase in viscosity in the fluid.

In one embodiment, fluid is caused to flow from the drainage pipe and up through a riser portion of the production pipe using an injector for a gaseous medium at or downstream of the heel. The rate of flow of fluid downstream of the heel can be controlled by means of a controllable injector. The gaseous medium is injected to increase draw down in the drainage pipe and to cause a reduction in density of the fluid in order to transport fluid and condensate towards a collection tank (not shown) at the surface. As the injected gaseous medium and fluid flows upwards, the local pressure in the riser decreases and at least some of the hydrocarbons and condensate may flash and assist in the upward transport of the fluid. The rate of flow of fluid can be controlled by controlling the amount of gaseous medium supplied by the injector.

The pressure drop in the drainage pipe can be limited by means of a production choke arranged upstream of the injector.

Without a production choke, fluids such as condensate or superheated water entering the drainage pipe can be allowed to flash. Flashing can be caused by the pressure drop across the inflow control devices and is used for providing additional assistance to the flow towards the heel and in the upward transport of fluid through the riser.

With a production choke, the fluid entering the drainage pipe can be prevented from flashing upstream of the choke. The production choke maintains the pressure in the drainage pipe above a predetermined level and reduces or prevents flashing in the drainage pipe upstream of the production choke. This can be used for maintaining an even flow of fluid through the drainage pipe. Once past the production choke, the reduction in pressure across the choke causes the condensate to undergo a partial vaporization referred to as a flash vaporization. The fluid containing water and/or condensate can be allowed to flash to provide additional assistance to the flow towards the heel and in the upward transport of the fluid through the riser.

The injector may inject a gaseous medium such as steam or gas to increase draw down in the drainage pipe and to cause a reduction in density of the fluid in order to transport fluid and condensate towards the surface or to a collection point located above the heel. As the injected gaseous medium and fluid flows upwards, the local pressure in the riser decreases and at least some of the hydrocarbons and condensate may flash and assist in the upward transport of the fluid. Natural gas condensate is a low-density mixture of hydrocarbon liquids that are present as gaseous components in the raw natural gas. Natural gas condensate is also referred to as simply condensate, or gas condensate.

Local hot spots are caused by formation fluid heated above its saturation temperature by, for instance, steam injected into the formation to heat it and make the liquid hydrocarbons more viscous to increase the yield of the production pipe. Ideally, a heated front passing through the formation propagates at the same speed. However, local variations in porosity in the formation can cause the front to reach the drainage pipe faster in some locations, thus creating a hot spot where water or condensate can flash adjacent the drainage pipe and disturb the inflow of fluid into said drainage pipe. An autonomous inflow control device of the type indicated will respond to a change in the composition of the fluid, such as a sudden increase of the amount of gas in the fluid, and/or in the viscosity, such as a reduction in viscosity when a heated hydrocarbon fluid reaches the valve.

If desired, the inflow control devices can also be arranged to autonomously reduce the flow of fluid in response to an increase in temperature of the fluid. The latter can be achieved by means of a temperature responsive device acting on the movable body or restricting the flow through a flow conduit in the valve.

In addition, a production choke can be arranged adjacent the heel upstream of the said injector, in order to limit the pressure drop in the drainage pipe. Without a production choke, the fluid, such as condensate or superheated water, entering the drainage pipe can be allowed to flash. Flashing can be caused by the pressure drop across the inflow control devices and can provide additional assistance to the flow towards the heel and in the upward transport of the fluid. With a production choke, the fluid entering the drainage pipe can be prevented from flashing. The production choke maintains the pressure in the drainage pipe above a desired level and reduces or prevents flashing prior to the production choke. Once past the production choke, the reduction in pressure across the choke causes the condensate to undergo a partial vaporization referred to as a flash vaporization. The fluid containing water and/or condensate can be allowed to flash provide additional assistance to the flow towards the heel and in the upward transport of the fluid.

Inflow through the inflow control devices can also be reduced by allowing the movable body to reduce the flow of fluid autonomously in response to an increase in temperature in the fluid. Temperature responsive means may be used in combination with the means responsive to flow velocity and/or viscosity in order to allow the inflow control device to close.

In such an embodiment, the valve may further comprise a movable valve body arranged to be acted on by a temperature responsive device. The valve body may be arranged to be actuated towards its closed position by the temperature responsive device in response to a predetermined increase in temperature in the fluid surrounding and/or entering the valve.

The temperature responsive device may comprise a sealed expandable means at least partially filled with a material that is arranged to undergo a significant expansion when the temperature in the fluid surrounding the device increases. Preferably, the expansion should be sufficient to substantially or fully close the valve when the temperature in the fluid surrounding the temperature responsive device increases above a predetermined value. Such an expansion can, for instance, be achieved by selecting a material that undergoes a phase change at a predetermined temperature. An example of such a phase change is a liquid which will boil at or above a predetermined temperature. The fluid can comprise a suitable alcohol, an alcohol/water mixture or acetone. The fluid may be selected depending on its boiling point at a predetermined pressure, which pressure is dependent on the pressure acting on the production pipe at the location of the valve, or inflow device. The fluid material may also be selected dependent on where the production pipe is located. For instance, a production pipe located at a depth of 300 meters can be subjected to pressures of 25-30 bar and temperatures of 250-290° C. during normal production conditions. In order to prevent a sudden influx of steam having a higher temperature through the valve, the expandable means can be filled with an alcohol-water mixture that boils at e.g. 280° C. During an undesirable increase of temperature in the fluid flowing through the valve, the expandable means is arranged to expand and cause a displacement of the movable valve body towards its closed position when the temperature of the fluid exceeds said predetermined temperature. In this way, the valve can be closed to prevent boiling or flashing water from entering the production pipe. Flashing or boiling can occur when the differential pressure across the inflow control device is relatively low. If boiling or flashing water is allowed to enter the production pipe, then this causes a "short circuit" of the injection pressure and the production pressure and causes the differential pressure to drop further. This has a negative effect on the efficiency of the drainage process, as outlined above. Other undesirable fluids that can be prevented from entering the production pipe are hot production gases or combustion gases used for increasing the production rate.

In order to control the opening and closing of the valve with varying temperatures, the expandable means may be arranged in contact with the fluid surrounding the production pipe or flowing through the valve. An expandable can be attached to a portion of the fluid chamber and expandable into contact with the movable valve body. Alternatively, the expandable means can be attached to the movable valve body and expandable into contact with fluid chamber.

BRIEF DESCRIPTION OF THE DRAWINGS

Embodiments of the invention will be described in detail, by way of example only, with reference to the attached figures. It is to be understood that the drawings are designed solely for the purpose of illustration and are not intended as a definition of the limits of the invention. It should be further understood that the drawings are not necessarily drawn to scale and that, unless otherwise indicated, they are merely intended to schematically illustrate the structures and procedures described herein.

DETAILED DESCRIPTION

Figure 1:
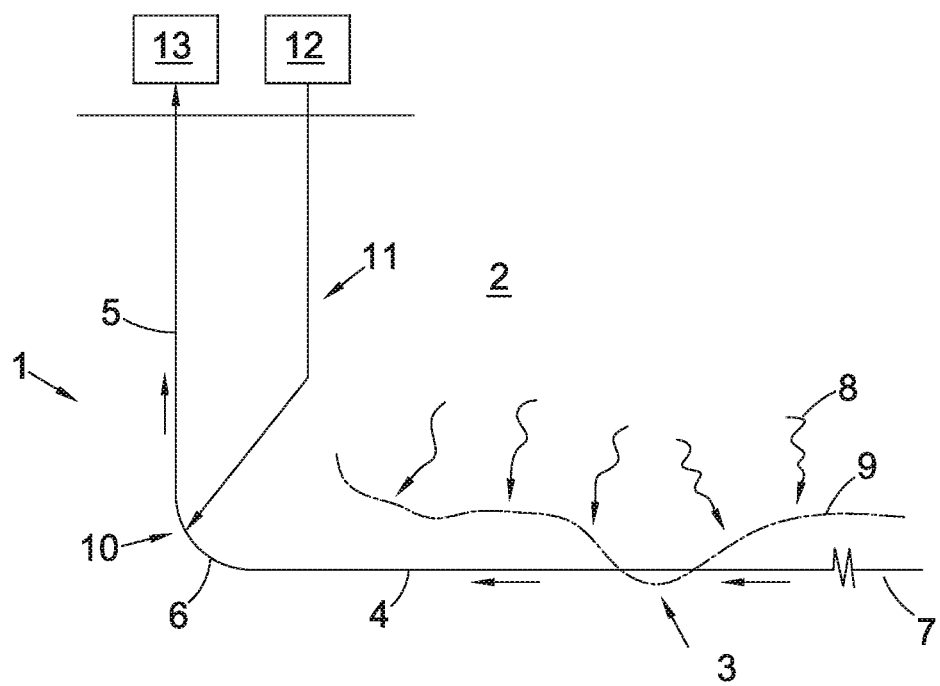
FIG. 1 shows a schematic view of a production pipe located in a reservoir formation with a local hot spot.

FIG. 1 shows a schematic view of a production pipe 1 located in a wellbore in a reservoir formation 2, where a local hot spot 3 is present adjacent a lower portion of the production pipe 1. The production pipe 1 comprises a drainage pipe 4, a riser 5 extending towards the surface, and a heel 6 connecting the drainage pipe 4 and the riser 5. The drainage pipe 4 ends in a toe 7 remote from the heel 6.

Local hot spots are caused by formation fluid heated above its saturation temperature by, for instance, steam 8 injected into the formation from a second wellbore (not shown) to heat the formation fluid and make the liquid hydrocarbons less viscous to increase the yield of the production pipe. Ideally, a heated front 9 (indicated by dash-dotted lines) passing through the formation 2 propagates at the same speed along the whole length of the front 9. However, local variations in porosity in the formation can cause a portion of the front 9 to reach the drainage pipe 4 faster in some locations, thus creating a hot spot 3 where water or condensate at or above their saturation temperature can flash adjacent the drainage pipe 4 and disturb the inflow of fluid into said drainage pipe 4. This creates a relatively hot zone around the drainage pipe 4 at the hot spot 3, while the remaining portions of the drainage pipe 4 is surrounded by a relatively cold zone where the fluids are below their saturation temperature.

The production pipe 1 comprises an injector 10 located at or downstream of the heel, which injector 10 is arranged to inject a gaseous medium 11 such as steam or gas to increase draw down in the drainage pipe 4. The gaseous medium 11 is supplied from a source 12 on the surface. Injection of a gaseous medium 11 causes a reduction in density of the fluid in order to transport fluid and condensate upwards in the riser 5 towards a collection tank 13 on the surface.

Figure 2:
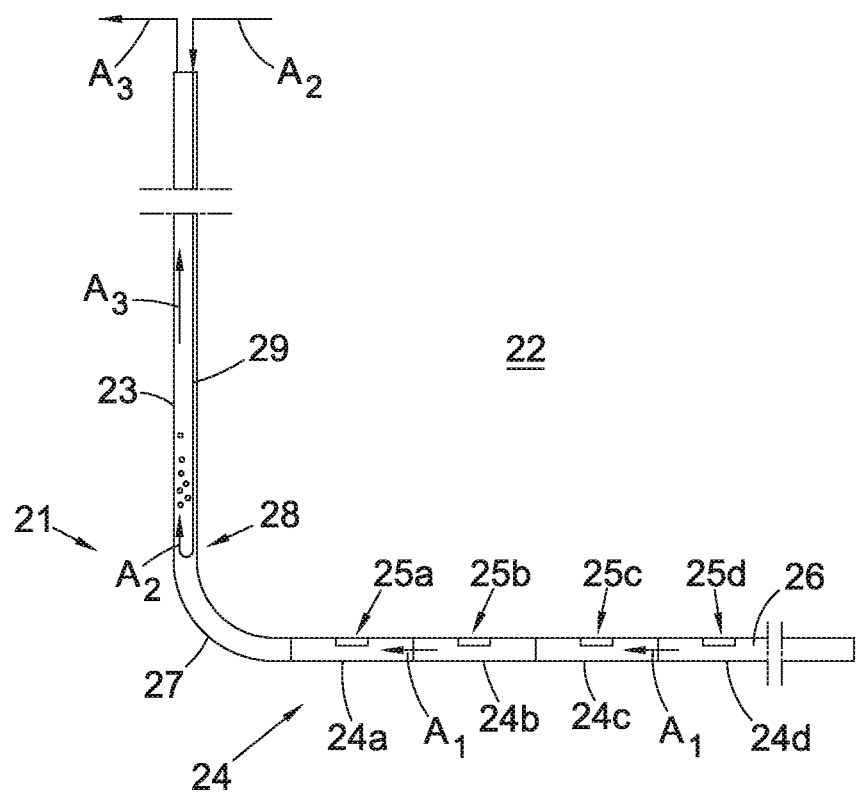
FIG. 2 shows a schematic view of a production pipe according to a first embodiment of the invention.

FIG. 2 shows a schematic view of a production pipe 21 according to a first embodiment of the invention. The production pipe 21 is arranged to control the inflow of a fluid from a formation along a length of the production pipe, such as a drainage pipe 24 draining fluid from a reservoir formation 22. The drainage pipe 24 comprises multiple sections 24a, 24b, 24c, 24d (four shown), each provided with one or more inflow control devices 25a, 25b, 25c, 25d (one shown per section) which connects the geological production formation 22 with an internal flow space 26 of the drainage pipe 24. The production pipe 21 further comprises an upper production pipe, or riser 23, for removing or collecting the fluid from the drainage pipe 24, and a heel section 27 connecting the riser 23 and the drainage pipe 24. The drainage pipe 24 extends between the heel 27 and a toe of said production pipe. The direction of flow in the drainage pipe 24 towards the heel 27 is indicated by arrows A1.

The production pipe also comprises an injector 28 located at or downstream of the heel 27, which injector is arranged to inject a gaseous medium such as steam or gas. The direction of flow of the gaseous medium is indicated by arrows A2. The gaseous medium is supplied from a source (not shown) at the surface and flows through a conduit 29 in the riser 23 to the injector 28. The gaseous medium is injected by injector 28 to increase draw down in the drainage pipe 24 and to cause a reduction in density of the fluid in order to transport fluid and condensate towards a collection tank (not shown) at the surface. The injection of the gaseous medium at the bottom of the riser 23 results in a reduction in the density of fluid in the riser 23, which in turn results in a lower pressure at the heel 27 at the bottom of the riser 23 due to the lower weight of the fluid in the riser 23. Because the pressure in the reservoir formation 22 is approximately constant, the reduction in pressure at the heel 27 results in an increase in the draw down, ie the pressure difference between the reservoir formation 22 and the inside of the drainage pipe 24. As the injected gaseous medium and fluid flows upwards, the local pressure in the riser decreases and at least some of the hydrocarbons and condensate may flash and assist in the upward transport of the fluid. The direction of flow in the riser 23 towards the surface is indicated by arrows A3.

The drainage pipe 24 is provided with inflow control devices 25a-25d each comprising a movable body provided within a housing. The movable body is arranged to adjust the flow of fluid through the inflow control device autonomously by exploiting the Bernoulli principle, wherein said inflow control device is arranged to reduce inflow locally from hot spots and/or to increase inflow remote from hot spots.

Local hot spots are caused by formation fluid heated above its saturation temperature, as described above. Local variations in porosity in the formation can cause the front to reach the drainage pipe 24 faster in some locations (see location "3" in FIG. 1), thus creating a hot spot where water or condensate can flash adjacent the drainage pipe and disturb the inflow of fluid into said drainage pipe. An autonomous inflow control device of the type indicated will respond to a change in the composition of the fluid, such as a sudden increase of the amount of gas in the fluid, and/or in the viscosity, such as a reduction in viscosity when a heated hydrocarbon fluid reaches the valve. If a hot spot reaches one inflow control device 25c in one section 24c of the drainage pipe 24, this device 25c will reduce the inflow, or momentarily close the device, in response to the increase in flow velocity and/or reduction in viscosity. This will reduce the inflow for this section of the drainage pipe and at least reduce the effect of the hot spot on the flow through the drainage pipe. The inflow control devices are designed never to fully close permanently, although they may close momentarily.

At the same time the remaining inflow control devices 25a, 25b, 25d, not subjected to a hot spot, will increase inflow in sections of the drainage pipe 24a, 24b, 24d where fluid in the formation is below its boiling point. Here, the inflow control devices 25a, 25b, 25d uses the Bernoulli effect and any stagnation pressure created over the movable body to open said autonomous inflow control devices. Inflow is increased through the inflow control devices by allowing the movable body to increase the flow of fluid autonomously in response to a reduced flow velocity and/or an increase in viscosity in the fluid. This will increase the draw down for these sections of the drainage pipe and assist in increasing the flow from parts of the formation where the heated front (see line "9" in FIG. 1) is moving at a slower rate. Hence, the arrangement according to the invention can assist in controlling the propagation of a heated front spreading through a formation and maintain an even flow of fluid through the drainage pipe in response to temperature variations along the length of the drainage pipe.

Figure 3:
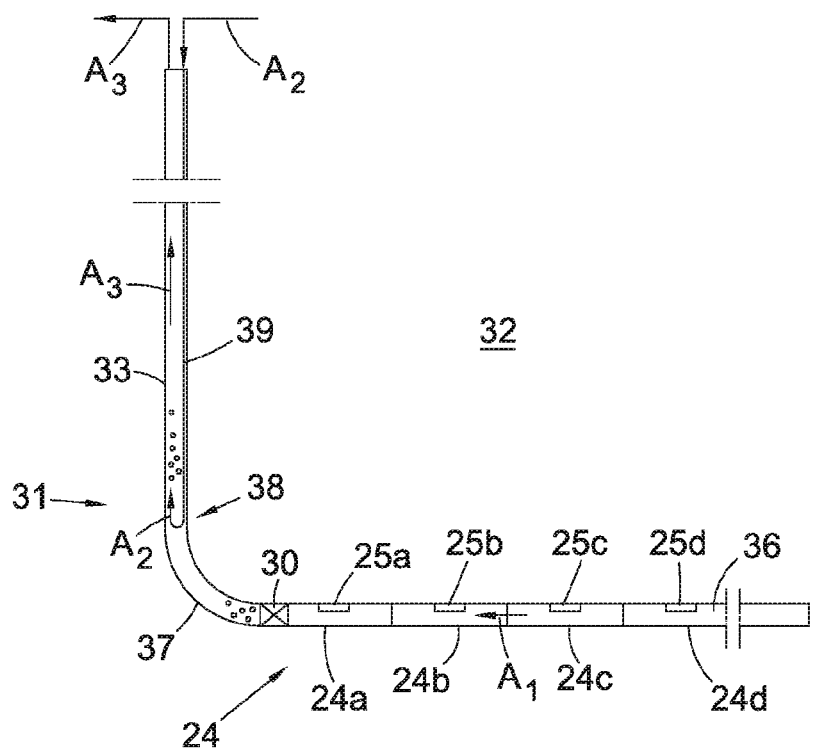
FIG. 3 shows a schematic view of a production pipe according to a second embodiment of the invention.

FIG. 3 shows a schematic view of a production pipe 31 according to a second embodiment of the invention. The production pipe 31 is arranged to control the inflow of a fluid from a formation along a length of the production pipe, such as a drainage pipe 34 draining fluid from a reservoir formation 32. The drainage pipe 34 comprises multiple sections 34a, 34b, 34c, 34d (four shown), each provided with one or more inflow control devices 35a, 35b, 35c, 35d (one shown per section) which connects the geological production formation 32 with an internal flow space 36 of the drainage pipe 34. The production pipe 31 further comprises an upper production pipe, or riser 33, for removing or collecting the fluid from the drainage pipe 34, and a heel section 37 connecting the riser 33 and the drainage pipe 34. The drainage pipe extends between the heel 37 and a toe of said production pipe. The direction of flow in the drainage pipe 34 towards the heel 37 is indicated by arrows A1.

The production pipe also comprises an injector 38 located at or downstream of the heel 37, which injector is arranged to inject a gaseous medium such as steam or gas. The direction of flow of the gaseous medium is indicated by arrows A2. The gaseous medium is supplied from a source (not shown) at the surface and flows through a conduit 39 in the riser 33 to the injector 38. The gaseous medium is injected to increase draw down in the drainage pipe and to cause a reduction in density of the fluid in order to transport fluid and condensate towards a collection tank (not shown) at the surface. As the injected gaseous medium and fluid flows upwards, the local pressure in the riser decreases and at least some of the hydrocarbons and condensate may flash and assist in the upward transport of the fluid. The direction of flow in the riser 33 towards the surface is indicated by arrows A3.

The embodiment of FIG. 3 differs from that of FIG. 2 in that a production choke 30 is arranged adjacent the heel 37 upstream of the said injector 28. The purpose of the production choke 30 is to limit the pressure drop in the drainage pipe 34.

Without a production choke, fluids such as condensate or superheated water entering the drainage pipe 24 can be allowed to flash. This is the case in FIG. 2, where flashing can be caused by the pressure drop across the inflow control devices 25a-25d and is used for providing additional assistance to the flow towards the heel 27 and in the upward transport of fluid through the riser 23.

With a production choke 30 as shown in FIG. 3, the fluid entering the drainage pipe 34 can be prevented from flashing. The production choke 30 maintains the pressure in the drainage pipe 34 above a predetermined level and reduces or prevents flashing prior to the production choke 30. This can be used for maintaining an even flow of fluid through the drainage pipe 34. Once past the production choke 30, the reduction in pressure across the choke causes the condensate to undergo a partial vaporization referred to as a flash vaporization. The fluid containing water and/or condensate is allowed to flash provide additional assistance to the flow towards the heel 37 and in the upward transport of the fluid through the riser 33.

Figure 4:
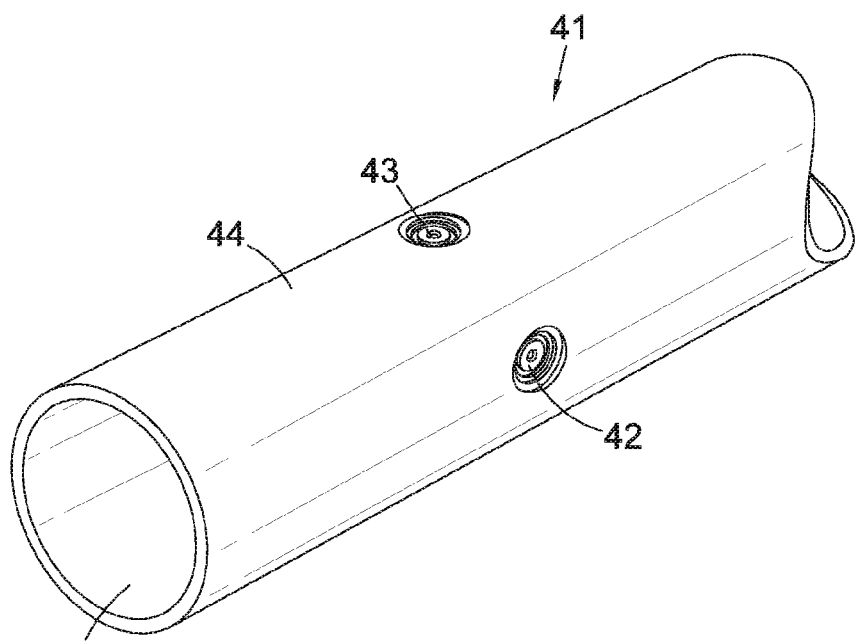
FIG. 4 shows a section of a drainage pipe that is part of a production pipe as illustrated in FIG. 2 or 3.

FIG. 4 shows a section of a drainage pipe 41, that is part of a production pipe. The drainage pipe 41 is provided with an opening in which an inflow control device in the form of an autonomous valve arrangement 42 according to the invention. The valve arrangement 42 is particularly useful for controlling the flow of fluid from a subterranean reservoir and into a drainage pipe 41 of a well in the oil and/or gas reservoir, between an inlet port 43 on an inlet side to at least one outlet port (not shown) on an outlet side of the autonomous valve arrangement 42. The component part making up the entire autonomous valve arrangement is subsequently referred to as a "valve arrangement", while the active components required for controlling the flow are commonly referred to as a "flow control device". The inlet side of the autonomous valve arrangement 42 is located in the opening on the outer side 44 of the drainage pipe 41, while the outlet side is located on the inner side 45 of the drainage pipe 41. In the subsequent text, terms such as "inner" and "outer" are used for defining positions relative to the inner and outer surface of the valve arrangement when mounted in a drainage pipe 41.

Figure 5:
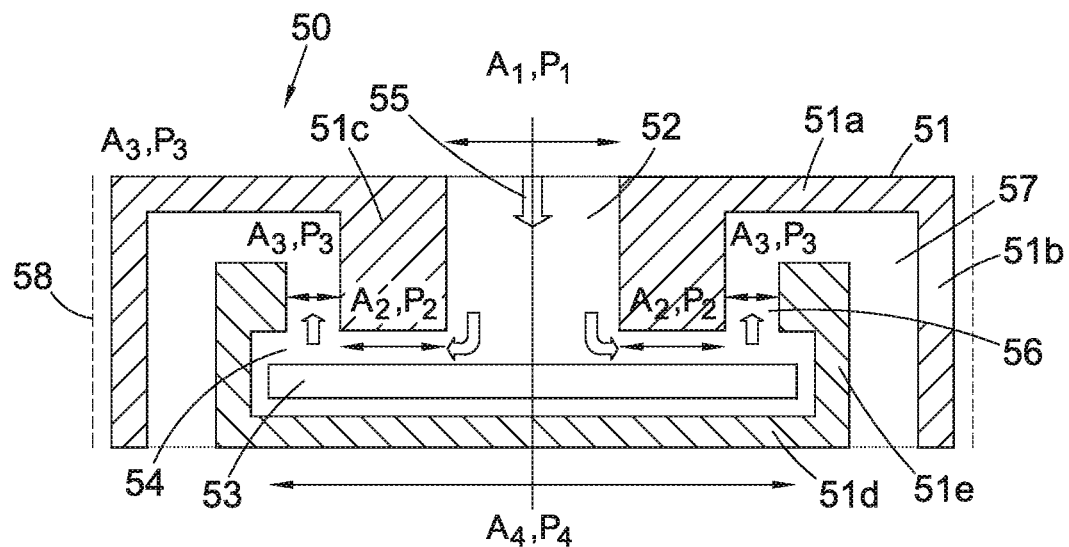
FIG. 5 shows a schematic valve arrangement suitable for use in a drainage pipe according to the invention.

FIG. 5 shows a schematic valve arrangement 50 suitable for use in a drainage pipe as described above. The valve arrangement comprises a housing 51 built up of a first disc-shaped housing body 51a with an outer cylindrical segment 51b and inner cylindrical segment 51c and with a central aperture or inlet port 52. The housing 51 further comprises a second disc-shaped holder body 51d with an outer cylindrical segment 51e, located between said outer cylindrical segment 51b and inner cylindrical segment 51c. A movable body or disc 53 is provided in a chamber 54 formed between the first and second disc-shaped housing and holder bodies 51a and 51d. The movable body 53 is preferably flat and is freely movable in the chamber 54. The main plane of the movable body 53 is arranged at right angles to the central axis of the central inlet port 52 and is freely movable along said axis. The movable body 53 can for particular applications and adjustments depart from the flat shape and have a partly conical or semicircular shape. In the case of a conical shape the apex is directed towards the inlet port 52. As can be seen from FIG. 5 the cylindrical segment 51e of the second disc-shaped holder body 51d fits within and protrudes in the opposite direction of the outer cylindrical segment 51b of the first disc-shaped housing body 51a, thereby forming a flow path as shown by the arrows 55, where the fluid enters the control device through the central inlet port 52 and flows towards and radially along the disc 53 before flowing through an annular opening 56 formed between the inner and outer cylindrical segments 51c and 51e and further out through an annular opening 57 formed between the respective outer cylindrical segments 51b and 51e. The two disc-shaped housing and holder bodies 51a, 51d are attached to one another by a screw connection, welding or other means (not further shown in the figure) and is mounted into a drainage pipe by means of an external threaded section 58.

The present invention exploits the effect of Bernoulli teaching that the sum of static pressure, dynamic pressure and friction is constant along a flow line:

$$\sum p = p_{static} + \frac{1}{2}\rho v^2 + \Delta p_{friction} \quad (1)$$

With reference to the valve shown in FIG. 5, when subjecting the movable valve body or disc 53 to a fluid flow, the pressure difference over the disc 53 can be expressed as follows:

$$\Delta p_{under} = [p_{under(f(p4))} - p_{over(f(p1,p2,p3))}] = \frac{1}{2}\rho v^2 \quad (2)$$

Due to lower viscosity, a fluid such as gas will "make the turn later" and follow further along the disc towards its outer periphery. This makes a higher stagnation pressure in the part of the chamber 54 located adjacent the area of the disc 53 remote from the inlet port 52, increasing the stagnation pressure on this side of the disc. Due to lower viscosity, a fluid such as gas will flow faster along the area of the disc facing the inlet port 52. This results in a reduction of the pressure on the area A2 above the disc. The disc 9, which is freely movable within the chamber between the disc-shaped bodies will move towards the inlet port and thereby narrow the flow path between the disc 53 and inner cylindrical segment 51c. In this way, the disc 53 moves relative to the inlet port 52 depending on the viscosity of the fluid flowing through, whereby this principle is used to control (partially close or open) the flow of fluid through of the valve arrangement.

Further, the pressure drop through a traditional inflow control device with fixed geometry will be proportional to the dynamic pressure:

$$\Delta p = K \frac{1}{2} \rho v^2 \quad (3)$$

where the constant, K is mainly a function of the geometry and less dependent on the Reynolds number. In the control device described here the flow area will decrease when the differential pressure increases, such that the volume flow through the control device will not, or nearly not, increase when the pressure drop increases. Hence, the flow-through volume for the present invention is substantially constant above a given differential pressure. This represents a major advantage with the present invention as it can be used to ensure a substantially constant volume flowing through each section for the entire horizontal well, which is not possible with fixed inflow control devices.

Figure 6:
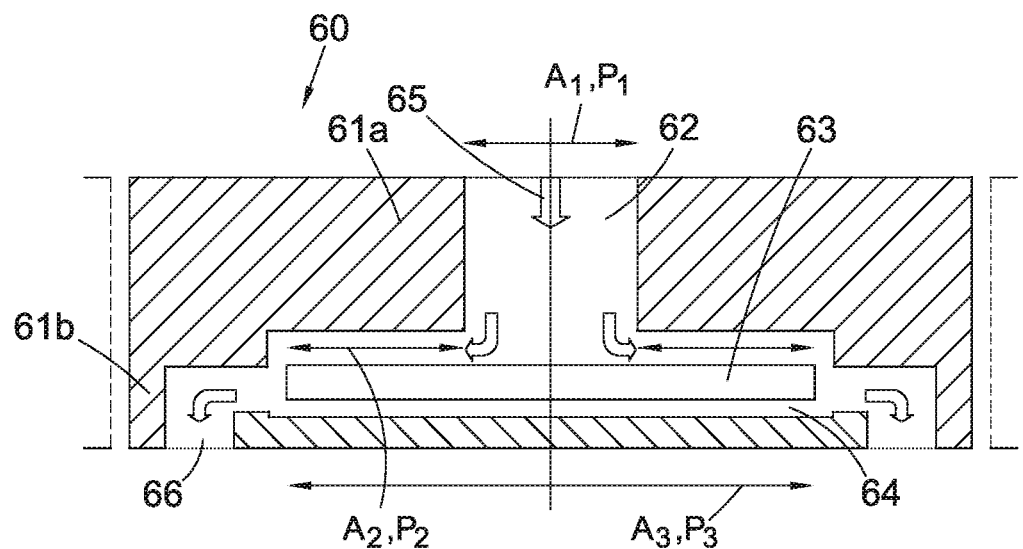
FIG. 6 shows a schematic alternative valve arrangement suitable for use in a drainage pipe according to the invention.

When producing oil and gas the flow control device according to the invention may have two different applications: Using it as inflow control device to reduce inflow of water or gas, or to maintain a constant flow through the flow control device. When designing the control device according to the invention for the different applications, such as constant fluid flow, the different areas and pressure zones, as shown in FIG. 6, will have impact on the efficiency and flow through properties of the device. Referring to FIG. 6, the different area/pressure zones may be divided into:

$A_1$, $P_1$ is the inflow area and pressure respectively. The force ($P_1 * A_1$) generated by this pressure will strive to open the control device (move the disc or body 53 away from the inlet port 52).

$A_2$, $P_2$ is the area and pressure in the zone between a first surface of the disc adjacent the inlet port and the chamber 54, where the velocity will be largest and hence represents a dynamic pressure source. The resulting dynamic pressure will strive to close the control device by moving the disc or body 53 towards the inlet port as the flow velocity increases and the pressure is reduced.

$A_3$, $P_3$ is the area and pressure at the outlet. This should be the same as the well pressure (inlet pressure).

$A_4$, $P_4$ is the area and pressure (stagnation pressure) behind the disc, remote from the inlet port. The stagnation pressure creates the pressure and the force behind the disc. This will strive to close the control device, moving the disc towards the inlet port.

Fluids with different viscosities will provide different forces in each zone depending on the design of these zones. In order to optimize the efficiency and flow through properties of the control device, the design of the areas will be different for different applications, e.g. gas/oil or oil/water flow. Hence, for each application the areas needs to be carefully balanced and optimally designed taking into account the properties and physical conditions (viscosity, temperature, pressure etc.) for each design situation. A valve of the type shown in FIG. 5 is described in WO2008/004875 as well as in WO2009/088292.

FIG. 6 shows a schematic alternative valve arrangement 60. The valve arrangement comprises, as in the valve arrangement shown in FIG. 5, a housing 61 built up of a first disc-shaped housing body 61a with an outer cylindrical segment 61b and with a central aperture or inlet port 62. The housing 61 further comprises a second disc-shaped holder body 61d attached to the outer cylindrical segment 61b of the housing body 61a, A movable body or disc 63 is provided in a chamber 64 formed between the first and second disc-shaped housing and holder bodies 61a and 61d. This valve arrangement differs from that of FIG. 5 in that the outlet comprises a number of outlet ports 66 connected to the chamber via radial apertures.

The flow path through the valve arrangement, indicated by arrows 65, shows that the fluid will flow in through the inlet port, radially across the disc, through the radial apertures and out through the outlet ports. Hence, there is no build up of stagnation pressure on the side of the disc 63 remote from the inlet port, as explained above in conjunction with FIG. 5. With this solution without stagnation pressure the building thickness for the device is lower and may withstand a larger amount of particles contained in the fluid.

With reference to the valve shown in FIG. 6, when subjecting the movable valve body or disc 63 to a fluid flow, the pressure difference over the disc 63 can be expressed as follows:

$$\Delta p_{under} = [p_{under(f(p3))} - p_{over(f(p1,p2))}] = \frac{1}{2}\rho v^2 \quad (4)$$

As described above, fluids with different viscosities will provide different forces in each zone depending on the design of these zones, in order to optimize the efficiency and flow through properties of the control device, the design of the areas will be different for different applications, e.g. constant volume flow, or gas/oil or oil/water flow. Hence, for each application the areas needs to be carefully balanced and optimally designed taking into account the properties and physical conditions (viscosity, temperature, pressure etc.) for each design situation.

Referring to FIG. 6, the different area/pressure zones may be divided into:

$A_1$, $P_1$ is the inflow area and pressure respectively. The force ($P_1*A_1$) generated by this pressure will strive to open the control device (move the disc or body 63 away from the inlet port 62).

$A_2$, $P_2$ is the area and pressure in the zone between a first surface of the disc adjacent the inlet port and the chamber 64, where the velocity will be largest and hence represents a dynamic pressure source. The resulting dynamic pressure will strive to close the control device by moving the disc or body 63 towards the inlet port as the flow velocity increases and the pressure is reduced.

$A_3$, $P_3$ is the area and pressure on the surface of the movable disc 63 located remote from the inlet port, between a second surface of the disc 63 and the chamber 64. The pressure behind the movable disc should be the same as the well pressure (inlet pressure). This will strive to close the control device, moving the disc towards the inlet port.

Due to lower viscosity, a fluid such as gas will flow faster along the disc 63 towards its outer periphery. This results in a reduction of the pressure on the area $A_2$ above the disc while the pressure acting on the area $A_3$ below the disc 63 remains unaffected. The disc 63 is arranged with its main plane at right angles to the central axis of the inlet port and is freely movable along said axis within the chamber. A reduction in viscosity will move the disc towards the inlet port and thereby narrow the flow path between the surface of the disc 63 facing the inlet port and the chamber 64. Thus, the disc 63 moves towards or away from the inlet port depending on the viscosity of the fluid flowing through, whereby this principle can be used to control the flow of fluid through of the device.

The valve further comprises a movable valve body arranged to be acted on by a temperature responsive device. The valve body is arranged to be actuated towards its closed position by the temperature responsive device in response to a predetermined increase in temperature in the fluid surrounding and/or entering the valve.

The temperature responsive device comprises a sealed expandable means at least partially filled with a fluid material that is arranged to undergo a phase change at a predetermined temperature. An example of such a phase change is a liquid which will boil at or above a predetermined temperature. The fluid material is selected dependent on where the production pipe is located. For instance, a production pipe located at a depth of 300 meters can be subjected to pressures of 25-30 bar and temperatures of 250-290° C. during normal production conditions. In order to prevent a sudden influx of steam having a higher temperature through the valve, the expandable means can be filled with an alcohol-water mixture that boils at e.g. 280° C. During an undesirable increase of temperature in the fluid flowing through the valve, the expandable means is arranged to expand and cause a displacement of the movable valve body towards its closed position when the temperature of the fluid exceeds said predetermined temperature. In this way, the valve can be closed to prevent boiling or flashing water from entering the production pipe. Flashing or boiling can occur when the differential pressure across the inflow control device is relatively low. If boiling or flashing water is allowed to enter the production pipe, then this causes a "short circuit" of the injection pressure and the production pressure and causes the differential pressure to drop further. This has a negative effect on the efficiency of the drainage process, as outlined above. Other undesirable fluids that can be prevented from entering the production pipe are hot production gases or combustion gases used for increasing the production rate.

In order to control the opening and closing of the valve with varying temperatures, the expandable means is arranged in contact with the fluid surrounding the production pipe or flowing through the valve.

Figure 7:
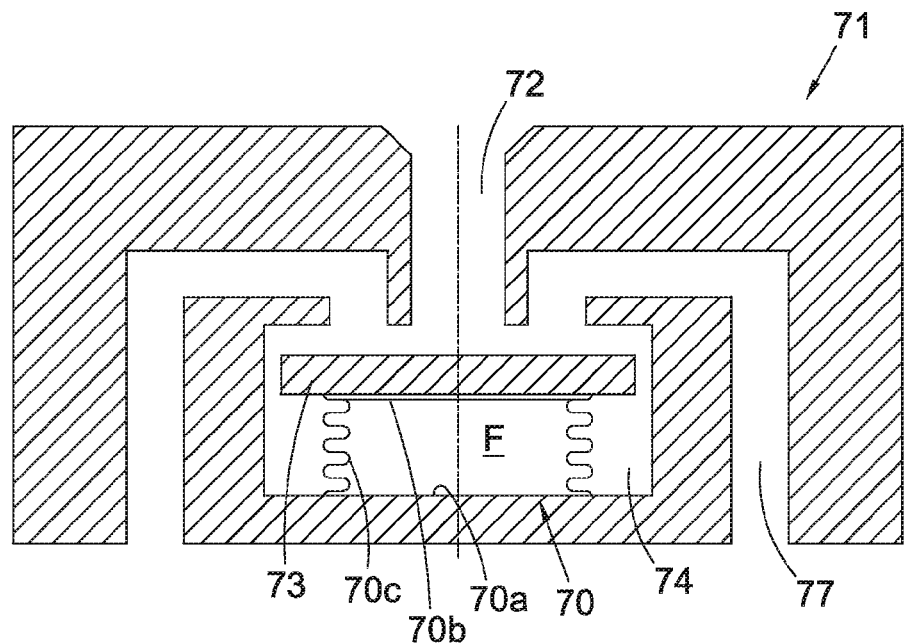
FIG. 7 shows a valve arrangement as illustrated in FIG. 5 provided with a heat expandable means according to a first example.

FIG. 7 shows a valve arrangement 71 as shown in FIG. 5 provided with a heat expandable means according to a first example. According to this example, an expandable means in the form of a bellows 70 is arranged in a fluid chamber 74 in the valve, which chamber contains a movable valve body in the form of a disc 73 controlling the fluid flow through the valve. The position of the disc 73 is normally controlled by an inflow of fluid from an inlet port 72 located facing the centre of the disc 73 and flowing radially outwards over at least a portion of the disc 73 and towards an outlet port 77. In this example, the bellows 70 is located on the opposite side of the disc 73 relative to the fluid inlet port 72. The bellows 70 comprises a first and a second substantially flat end surface 70a and 70b, which are connected by a corrugated section 70c. The sealed, expandable bellows 70 is at least partially filled with a fluid material that is arranged to undergo a phase change at a predetermined temperature. In this case the first end surface 70a of the bellows 70 is attached to a wall section of the fluid chamber 74 and is expandable into contact with the disc 73. Alternatively, the expandable means can be attached to the disc and expandable into contact with a wall section of the fluid chamber.

When an undesirable increase of temperature in the fluid flowing through the valve occurs, heat is transferred by the hot fluid to the bellows 70, partially through the disc 73 and partially around the outer edges thereof to the space between the chamber 74 and the disc 73 where the expandable means is located. If the expandable means contains a liquid, said liquid will begin to boil when the fluid flowing through the valve exceeds a predetermined temperature. This causes the bellows 70 to expand due to the increase in pressure and volume inside said bellows 70. As the bellows 70 expands it will displace the disc 73 towards its closed position and, if the temperature increase is sufficient, eventually close the valve.

The method of attachment of the bellows to a wall section as described here can also be used for the embodiment shown in FIG. 8 below.

Figure 8:
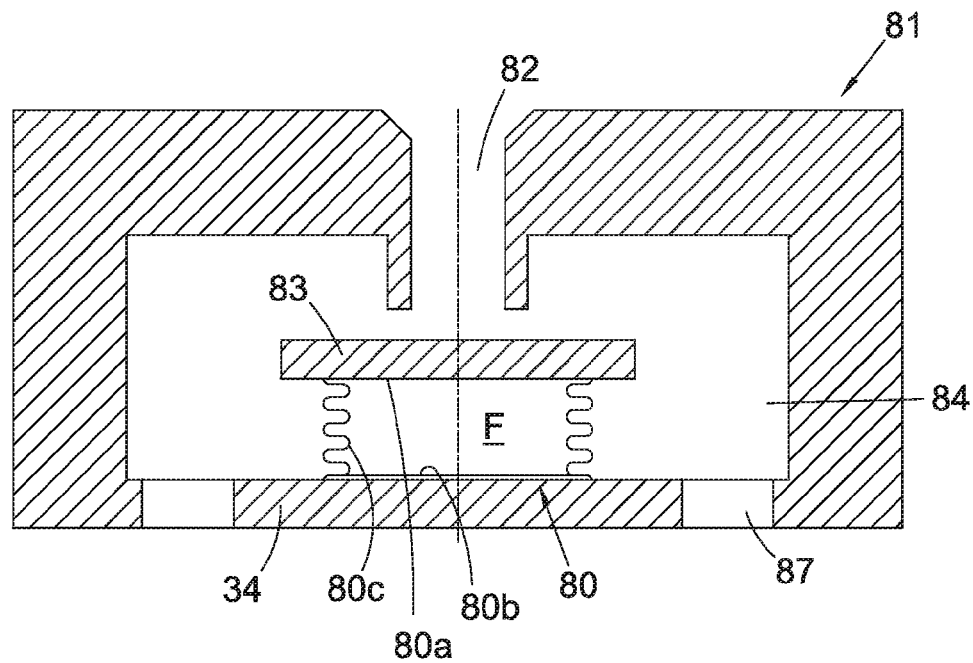
FIG. 8 shows a valve arrangement as illustrated in FIG. 6 provided with a heat expandable means according to a second example.

FIG. 8 shows a valve arrangement 81 as shown in FIG. 6 provided with a heat expandable means according to a second example. According to this example, an expandable means in the form of a bellows 80 is arranged in a fluid chamber 84 in the valve, which chamber contains a movable valve body in the form of a disc 83 controlling the fluid flow through the valve. The position of the disc 83 is normally controlled by an inflow of fluid from an inlet port 82 located facing the centre of the disc 83 and flowing radially outwards over at least a portion of the disc 83 and towards an outlet port 87. In this example, the bellows 80 is located on the opposite side of the disc 83 relative to the fluid inlet port 82. The bellows 80 comprises a first and a second substantially flat end surface 80a and 80b, which are connected by a corrugated section 80c. The sealed, expandable bellows 80 is at least partially filled with a fluid material that is arranged to undergo a phase change at a predetermined temperature. In this case the first end surface 80a of the bellows 80 is attached to the disc 83 and is expandable into contact with a wall section of the fluid chamber 84. Alternatively, the expandable means can be attached to the disc and expandable into contact with a wall section of the fluid chamber.

When an undesirable increase of temperature in the fluid flowing through the valve occurs, heat is transferred by the hot fluid to the bellows 80, partially through the disc 83 and partially around the outer edges thereof to the space between the chamber 84 and the disc 83 where the expandable means is located. If the expandable means contains a liquid, said liquid will begin to boil when the fluid flowing through the valve exceeds a predetermined temperature. This causes the bellows 80 to expand due to the increase in pressure and volume inside said bellows 80. As the bellows 80 expands it will displace the disc 83 towards its closed position and, if the temperature increase is sufficient, eventually close the valve.

The method of attachment of the bellows to the disc as described here can also be used for the embodiment shown in FIG. 7 above.

The expandable means described in connection with FIGS. 7 and 8 is a sealed container in the form of a bellows, at least partially filled with a fluid material. Alternatively, the container can have a predetermined general shape with at least a portion being resiliently deformable, or be in the form of a bag with a non-specified shape. In this case, the expandable means can be held in a desired position by locating means on the movable valve body or the chamber wall, without being physically attached to either component. For example, the expandable means can be maintained in position by locating means in the form of a number of projections extending into the chamber to support the movable valve body in its end position where the valve is fully open. Examples of such supporting projections can be found in the filed international application PCT//EP2011/050471. This alternative is preferable for expandable means having a substantially shapeless form, which can expand uniformly in all directions.

The invention is not limited to the above examples.

The invention claimed is:

1. A method of controlling fluid flow into a heavy oil production pipe, the method comprising the steps of:
   reducing inflow into said production pipe locally from hot spots using inflow control devices comprising a movable body provided within a housing, the movable body being arranged to adjust the flow of fluid through the inflow control devices autonomously by exploiting the Bernoulli principle;
   increasing inflow into said production pipe remote from said hot spots using said inflow control devices to increase inflow locally;
   increasing draw down in said production pipe by using a controllable injector to inject a gaseous medium at or downstream of said inflow control devices; and
   controlling the rate of flow of fluid downstream of said inflow control devices using said injector,
   wherein the production pipe comprises the injector and the injector injects the gaseous medium into the heavy oil in the production pipe.

2. The method according to claim 1, further comprising the step of controlling the inflow control devices depending on at least one of the composition, the density and/or viscosity of the fluid.

3. The method according to claim 1, further comprising the step of reducing inflow in sections of the production pipe where fluid in the formation is at or above its boiling point by closing said autonomous inflow control devices at least partially.

4. The method according to claim 1, further comprising the step of reducing inflow through the inflow control devices by allowing the movable body to reduce the flow of fluid autonomously in response to an increase in flow velocity and/or a reduction in viscosity in the fluid.

5. The method according to claim 1, further comprising the step of reducing inflow through the inflow control devices by allowing the movable body to reduce the flow of fluid autonomously in response to an increase in temperature in the fluid.

6. The method according to claim 1, further comprising the step of increasing inflow in sections of the production pipe where fluid in the formation is below its boiling point using said autonomous inflow control devices.

7. The method according to claim 6, further comprising the step of increasing inflow through the inflow control devices by allowing the movable body to increase the flow of fluid autonomously in response to a reduction in flow velocity and/or a increase in viscosity in the fluid.

8. The method according to claim 1, further comprising the step of limiting the pressure drop in the production pipe by means of a production choke arranged upstream of the injector.

9. The method according to claim 1, wherein said production pipe comprises an upper production pipe, a drainage pipe, and a heel connecting said upper production pipe to said drainage pipe.

10. The method as claimed in claim 9, further comprising the step of injecting said gaseous medium at or downstream of said heel.

11. A heavy oil production system comprising:
- a production pipe for draining fluid from a reservoir formation, said production pipe having multiple sections each provided with one or more inflow control devices each of which connects said formation with a flow space within said production pipe;
- inflow control devices each comprising a movable body provided within a housing, the movable body being arranged to adjust the flow of fluid through the inflow control device autonomously by exploiting the Bernoulli principle; and
- an injector for injecting a gaseous medium at or downstream of said inflow control devices, to increase draw down in said production pipe,
- wherein said inflow control devices are arranged to reduce inflow from hot spots locally and/or to increase inflow remote from hot spots,
- wherein the production pipe comprises the injector arranged to allow said injecting to inject a said gaseous medium into said fluid in the production pipe, and
- wherein the injector is a controllable injector arranged to control the rate of flow of fluid downstream of the inflow control devices.

12. The production system as claimed in claim 11, wherein said production pipe comprises an upper production pipe, a drainage pipe, and a heel connecting said upper production pipe to said drainage pipe.

13. The production system as claimed in claim 12, wherein said injector is arranged to inject said gaseous medium at or downstream of said heel.

14. The production system according to claim 12, wherein said inflow control devices are arranged to be responsive to at least the composition and/or viscosity of the fluid.

15. The production system according to claim 11, wherein said inflow control devices are arranged to close at least partially to reduce inflow in sections of the drainage pipe where fluid in the formation is at or above its boiling point.

16. The production system according to claim 11, wherein the movable body of each inflow control device is arranged to reduce the flow of fluid through the inflow control devices autonomously in response to an increase in flow velocity and/or a reduction in viscosity in the fluid.

17. The production system according to claim 11, wherein the movable body of each inflow control device is arranged to reduce the flow of fluid through the inflow control devices autonomously in response to an increase in temperature of the fluid.

18. The production system according to claim 11, wherein said inflow control devices are arranged to open to increase inflow in sections of the production pipe where fluid in the formation is below its boiling point.

19. The production system according to claim 11, wherein the movable body of each inflow control device is arranged to increase the flow of fluid through the inflow control device autonomously in response to a decrease in flow velocity and/or an increase in viscosity in the fluid.

20. The production system according to claim 11, further comprising a production choke arranged downstream of the injector, in order to limit the pressure drop in the production pipe.

21. A method of using inflow control devices in a heavy oil production pipe, said method comprising the step of:
- using the inflow control devices, each comprising a movable body provided within a housing, the movable body being arranged to adjust the flow of fluid through the inflow control device autonomously by exploiting the Bernoulli principle;
- reducing inflow locally from hot spots using said inflow control devices;
- increasing inflow remote from hot spots using said inflow control devices to increase inflow locally;
- using a controllable injector of the production pipe to inject a gaseous medium into said fluid in the production pipe, and
- controlling the rate of flow of fluid downstream of said inflow control devices using said injector.

22. The method according to claim 21, further comprising the step of increasing draw down in said production pipe by using an injector to inject a gaseous medium at or downstream of said inflow control devices.

* * * * *